United States Patent
Stoiber et al.

(10) Patent No.: US 11,237,910 B2
(45) Date of Patent: Feb. 1, 2022

(54) METHOD AND APPARATUS FOR SAVING AND RESTORING STATE INFORMATION

(71) Applicant: Atmosic Technologies Inc., Campbell, CA (US)

(72) Inventors: Steven Thomas Stoiber, Saratoga, CA (US); David Kuochieh Su, Saratoga, CA (US)

(73) Assignee: Atmosic Technologies Inc., Campbell, CA (US)

( * ) Notice: Subject to any disclaimer, the term of this patent is extended or adjusted under 35 U.S.C. 154(b) by 326 days.

(21) Appl. No.: 16/394,785

(22) Filed: Apr. 25, 2019

(65) Prior Publication Data
US 2020/0073757 A1 Mar. 5, 2020

Related U.S. Application Data

(60) Provisional application No. 62/726,519, filed on Sep. 4, 2018.

(51) Int. Cl.
| | | |
|---|---|---|
| G06F 11/14 | (2006.01) | |
| G06F 3/06 | (2006.01) | |
| G06F 1/28 | (2006.01) | |
| G06F 1/3234 | (2019.01) | |
| H04W 88/02 | (2009.01) | |

(52) U.S. Cl.
CPC .......... *G06F 11/1415* (2013.01); *G06F 1/28* (2013.01); *G06F 1/3234* (2013.01); *G06F 3/068* (2013.01); *G06F 3/0619* (2013.01); *G06F 3/0634* (2013.01); *G06F 3/0647* (2013.01); *H04W 88/02* (2013.01)

(58) Field of Classification Search
CPC ...... G06F 11/1415; G06F 1/28; G06F 1/3234; G06F 3/0619; G06F 3/0634; G06F 3/0647; G06F 3/068; H04W 88/02
See application file for complete search history.

(56) References Cited

U.S. PATENT DOCUMENTS

| | | | | |
|---|---|---|---|---|
| 2005/0283648 A1* | 12/2005 | Ashmore | ............... | G06F 1/3268 714/5.11 |
| 2010/0102625 A1* | 4/2010 | Karimi | .................... | B60L 50/40 307/9.1 |
| 2013/0005394 A1* | 1/2013 | Geary | ................. | H04W 52/028 455/552.1 |
| 2018/0287418 A1* | 10/2018 | Zeine | ...................... | H02J 50/80 |
| 2019/0074915 A1* | 3/2019 | Greene | ................ | G01S 13/758 |

* cited by examiner

*Primary Examiner* — Henry Tsai
*Assistant Examiner* — John B Roche
(74) *Attorney, Agent, or Firm* — Paradice & Li LLP (57) ABSTRACT

This disclosure provides a method and apparatus for saving and restoring state information of a wireless device with varying amounts of available power, such as wireless devices that may harvest power from radio-frequency signals. The wireless device may save and restore varying amounts of state information based at least in part on the amount of power available. In some embodiments, some of the stored state information may be lost as the available power decreases.

17 Claims, 5 Drawing Sheets

METHOD AND APPARATUS FOR SAVING AND RESTORING STATE INFORMATION

CROSS-REFERENCE TO RELATED APPLICATION

This application claims the benefit of commonly owned U.S. Provisional Patent Application No. 62/726,519 entitled "METHOD AND APPARATUS FOR SAVING AND RESTORING STATE INFORMATION" filed on Sep. 4, 2018, the entirety of which is hereby incorporated by reference.

TECHNICAL FIELD

The present embodiments relate generally to saving and restoring system state information, and specifically to saving and restoring system state information based on available power when transitioning between an active power mode and a low power mode.

BACKGROUND OF RELATED ART

Wireless devices (such as Wi-Fi devices, Bluetooth devices, wireless sensors, and IoT devices) are often battery powered to provide mobility and convenience. Reducing the power consumption of wireless devices may extend battery life and thereby increase the time between battery recharging or replacement. Some wireless devices may not include batteries or other similar power sources, relying instead on harvesting power from radio-frequency (RF) energy emitted by other devices.

To conserve power, the wireless device may leave an active power mode and enter a low-power mode during which power is not supplied to one or more portions of the wireless device. Prior to entering the low-power mode, state information, which may include register settings of the wireless device, is saved in a non-volatile memory. When exiting the low-power mode, the state information is retrieved from the non-volatile memory and used to restore the wireless device to an operational state similar to the state before the low-power mode was entered. Although the energy costs associated with saving and restoring state information may be relatively constant, wireless devices relying on harvested power may have variable (and unpredictable) amounts of power available. In some cases, it may require more power to save and restore state information than may be available to the portable device.

Thus, there is a need to flexibly save and restore the state information of a wireless device based on its available power.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure may be implemented as a method for saving and restoring state information of a wireless device. In some implementations, the method may include storing, in a memory, state information associated with one or more operations performed by the wireless device, powering down at least part of the wireless device, determining an amount of available power of the wireless device, selecting one or more operations to restore based on the determined amount of available power, and restoring the state information of the one or more selected operations from the memory.

Another innovative aspect of the subject matter described in this disclosure may be implemented in a wireless device. In some implementations, the wireless device may include an energy harvester configured to convert radio-frequency energy into power for the wireless device, one or more processors, and a memory. The memory may store instructions that, when executed by the one or more processors, cause the wireless device to store state information associated with one or more operations performed by the wireless device, power down at least part of the wireless device, determine an amount of available power of the wireless device, select one or more operations to restore based on the determined amount of available power, and restore the state information of the one or more selected operations.

Another innovative aspect of the subject matter described in this disclosure may be implemented in an apparatus. The apparatus may include means for converting radio-frequency energy into power, means for storing state information associated with one or more operations performed by the apparatus, means for powering down at least part of the apparatus, means for determining an amount of available power of the apparatus, means for selecting one or more operations to restore based on the determined amount of available power, and means for restoring the state information of the one or more selected operations.

BRIEF DESCRIPTION OF THE DRAWINGS

Aspects of the present disclosure are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices (such as a combination of a DSP and a microprocessor), a plurality of microprocessors, one or more microprocessors in conjunction with a DSP core, or any other suitable configuration.

Figure 1:
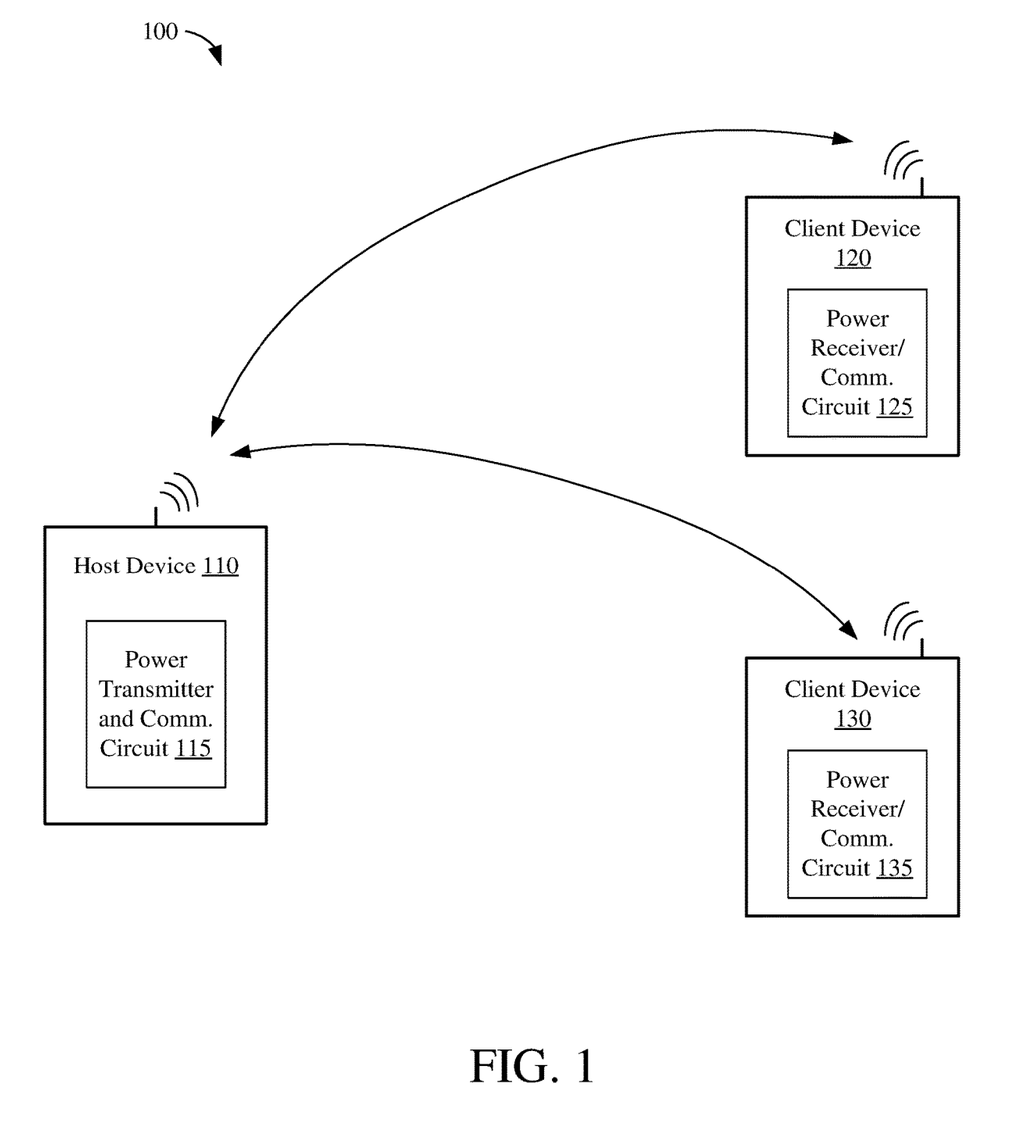
FIG. 1 depicts a wireless communication system within which aspects of the present disclosure may be implemented.

FIG. 1 depicts a wireless communication system 100 within which aspects of the present disclosure may be implemented. The wireless communication system 100 may include one or more wireless communication devices such as a host device 110 and client devices 120 and 130. The host device 110 and the client devices 120 and 130 may be any suitable wireless communication device. Example wireless communication devices may include a cell phone, personal digital assistant (PDA), tablet device, laptop computer, or any other suitable portable device. The host device 110 and the client devices 120 and 130 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

For ease of explanation and clarity, the wireless communication system 100 depicts a single host device 110 and two client devices 120 and 130. In other embodiments, the wireless communication system 100 may include any technically feasible number of host devices and/or client devices. The host device 110 and the client devices 120 and 130 may communicate with each other via one or more technically feasible wireless communication protocols. In some implementations, the host device 110 and the client devices 120 and 130 may communicate with each other (and with other devices not shown for simplicity) via Wi-Fi, Bluetooth®, Bluetooth Low Energy (BLE), Long Term Evolution (LTE), or any other suitable communication protocol. In some other implementations, the host device 110 and client devices 120 and 130 may operate within the 900 MHz band, the 2.4 GHz industrial, scientific, and medical (ISM) band, the 5 GHz ISM band, the 60 GHz band or any other technically feasible frequency band.

In some implementations, the client devices 120 and 130 may not be battery powered or externally powered, but may instead derive power from RF energy transmitted by other devices and received by the client devices 120 and 130. For example, the client devices 120 and 130 may be small, remote devices for which battery and/or external power sources are not feasible, available, or desirable. In some aspects, the client devices 120 and 130 may be environmental sensors (such as temperature sensors, air pressure sensors, humidity sensors, etc.), door position sensors, window position sensors, and the like. In other aspects, the client devices 120 and 130 may be any suitable IoT device (such as sensors, motion detectors, relay devices, and so on).

In some implementations, the client device 120 may include a power receiver/communication circuit 125. The power receiver/communication circuit 125 may receive RF energy from the host device 110 (or any other nearby device that transmits or emits RF energy) and convert the RF energy into power (such as a voltage/current) for the client device 120. In this manner, some or all of the operations of the client device 120 may be powered by RF energy transmitted from the host device 110. In addition, the power receiver/communication circuit 125 may provide communication functionality for the client device 120. For example, the power receiver/communication circuit 125 may include a transceiver to wirelessly transmit and receive data via RF signals between the client device 120 and the host device 110, between the client device 120 and the client device 130, and/or between the client device 120 and one or more other wireless devices (not shown for simplicity). Notably, the RF signals used for communication may be converted into power for the client device 120. That is, the client device 120 may harvest power from RF communication signals and may not require separate or dedicated RF signals to provide the RF energy to be converted into power for the client device 120. Similar to the client device 120, the client device 130 may also include a power receiver/communication circuit 135 to convert RF energy into power and provide communication functionality.

In some implementations, the host device 110 may be powered by a battery or through an external power source. Thus, the host device 110 may be well suited to transmit power via RF energy to the client devices 120 and/or 130. In some implementations, the host device 110 may include a power transmitter/communication circuit 115. The power transmitter/communication circuit 115 may convert power from a local power source (such as battery power and/or an external power source, not shown for simplicity) into RF energy that may be transmitted to other wireless devices (such as the client devices 120 and 130). In addition, the power transmitter/communication circuit 115 may provide communication functionality for the host device 110. For example, the power transmitter/communication circuit 115 may include a transceiver to wirelessly transmit and receive data via RF signals between the host device 110 and a number of other devices (such as the client devices 120 and 130).

In some aspects, the RF signals may be transmitted within frequency bands that may be shared with other transceivers provided within the client devices 120 and 130, respectively. For one example, the client devices 120 and 130 may include one or more transceivers (including Wi-Fi and Bluetooth transceivers) that operate within a 6 MHz, a 13 MHz, a 27 MHz, a 40 MHz, a 400 MHz, a 900 MHz, a 2.4 GHz, a 5 GHz, and a 60 GHz industrial, scientific, and medical (ISM) band. In another example, the client devices 120 and 130 may include one or more cellular transceivers that operate within various frequency bands (some of which may overlap frequency bands used by the one or more Wi-Fi and/or Bluetooth transceivers). Thus, the RF signal and the power receiver/communication circuits 125 and 135 of respective client devices 120 and 130 may share an ISM band used by other transceivers of the respective client devices 120 and 130.

In some implementations, the RF signals may not be associated with any commercially available communication protocol (such as Wi-Fi and Bluetooth communication protocols), but instead may be based on a signaling technique independent of commercially available communication protocols (such as a proprietary or military communication protocol).

In some implementations, the power receiver/communication circuits 125 and 135 may each include a plurality of RF power harvesters. Each RF power harvester may convert RF energy into power for some or all of the associated client device. Further, each client device 120 and 130 may leave a first mode (such as an operating mode or an active power mode) and enter a second mode (such as a low-power mode) during periods of inactivity to conserve power. In the low-power mode, power may be temporarily removed (disconnected) from one or more portions of the client device. Prior to entering the low-power mode, state information (e.g., memory data, register data, flip-flop state information, or the like, associated with portion of the client device entering the low-power mode) may be saved in static random access memory (SRAM) and then copied from the SRAM to a non-volatile memory. When exiting the low-power mode, the state information may be copied from the non-volatile memory to the SRAM. The state information in the SRAM may be used to restore the memories, registers, flip-flops, or the like, into the same state they were in prior to entering the low-power mode.

In some implementations, the harvested power from the RF power harvesters available to the client device may vary, and therefore the amount of power available to perform save and restore operations also may vary (and may be unpredictable). To accommodate for the varying and potentially unpredictable amount of available power, the save and restore operations may be determined and/or modified based on the amount of available power. For example, if more harvested power is available, more state information may be saved and/or restored. Conversely, if less harvested power is available, less state information may be saved and/or restored. Operations associated with saving and restoring state information based on amounts of available power are described in more detail below with respect to FIGS. 2, 3A, 3B, and 4.

Figure 2:
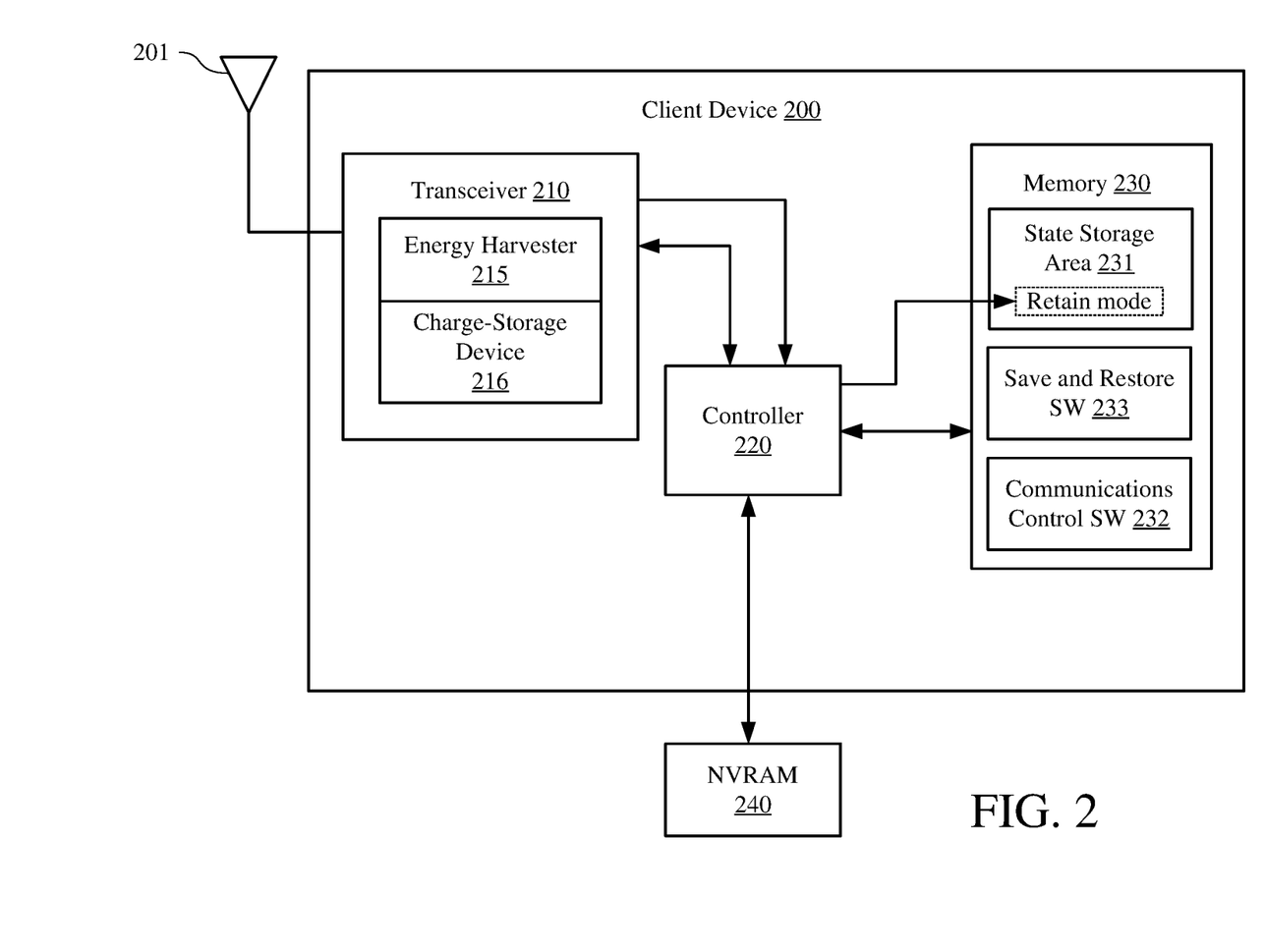
FIG. 2 is a block diagram of an example wireless device.

FIG. 2 is a block diagram of an example client device 200. The client device 200 may be an implementation of the client device 120 and/or the client device 130 of FIG. 1. The client device 200 may include an antenna 201, a transceiver 210, a controller 220 and a memory 230. Although only one antenna 201 is shown associated with the client device 200, in other implementations, the client device 200 may include any feasible number of antennas. Similarly, although only one transceiver 210 is shown in the client device 200, in other implementations, the client device 200 may include any feasible number of transceivers. Furthermore, the transceiver 210 may be an implementation of the power receiver/communication circuits 125 and 135 of respective client devices 120 and 130 of FIG. 1.

The transceiver 210 may include circuits, components, and/or devices to enable the client device 200 to transmit and receive RF communication signals. For example, the client device 200 may include one or more transmit and receive chains to process RF communication signals including, but not limited to, Wi-Fi, Bluetooth, BLE, and/or LTE signals. The transceiver 210 also may include an energy harvester 215. The energy harvester 215 may be coupled to, and receive RF energy from, the antenna 201. The energy harvester 215 may harvest (convert) the RF energy into power (e.g., a voltage and/or current) to power, at least partially, the client device 200. The energy harvester 215 may include, or be coupled to, a charge-storage device 216 to, at least temporarily, store harvested power. In some implementations, the charge-storage device 216, may be a capacitor, a super capacitor, or a rechargeable battery. Although the transceiver 210 depicts only one energy harvester, in other implementations, the transceiver 210 may include any technically feasible number of energy harvesters.

The transceiver 210 may be coupled to the controller 220. The controller 220 may provide data to and receive data from the transceiver 210 associated with the RF communication signals. In addition, the controller 220 may determine how much power is available from the energy harvester 215. In some example implementations, the controller 220 may determine how much power is available in an associated power storage device such as the charge-storage device 216.

The controller 220 may be coupled to a non-volatile random access memory (NVRAM) 240. The NVRAM 240 may provide persistent data storage in the absence of power. In some implementations, the NVRAM may be FLASH memory, battery backed RAM or any other feasible memory capable of retaining data without power. As shown in FIG. 2, the NVRAM 240 may be separate from (external to) the client device 200. In other example implementations, the NVRAM 240 may be included within the client device 200, not shown for simplicity.

The memory 230 may include a state storage area 231 to store device state information. As described above with respect the FIG. 1, state information may be associated with memories, registers, flip-flops, etc., of the client device 200. In some implementations, one or more regions of the state storage area 231 may operate in a "retain mode." In the retain mode, some regions of the state storage area 231 may operate in a manner that consumes very low power while retaining (protecting from deletion) the memory contents. However, the regions of the state storage area 231 that are in the retain mode are unavailable for access (e.g., the regions of the state storage area 231 in the retain mode cannot be read from nor written to). After portions or regions of the state storage area 231 are returned to a normal operating mode (from the retain mode), the memory contents may again be accessed.

Further, the memory 230 may include a non-transitory computer-readable storage medium (such as one or more nonvolatile memory elements, such as EPROM, EEPROM, Flash memory, a hard drive, etc.) that may store the following software (SW) modules:

- a communications control SW module 232 to control wireless transmission and reception operations of the communication transceiver 210, for example, as described below with respect to one or more operations of FIGS. 3A, 3B, and 4; and
- a save and restore SW module 233 to manage save and restore operations of the client device 200. In some implementations, the save and restore operations may include transitioning between the low-power and active power modes, for example, as described below with respect to one or more operations of FIGS. 3A, 3B, and 4.

In some implementations, one or more of the software modules 232 and 233 may be executed as a user application program. Each of the software modules 232 and 233 includes program instructions that, when executed by the controller 220, may cause the client device 200 to perform the corresponding function(s). Thus, the non-transitory computer-readable storage medium of memory 230 may include instructions for performing all or a portion of the operations of FIGS. 3A, 3B, and 4.

The controller 220, which may be coupled to the transceiver 210, the memory 230, and the NVRAM 240, may be any one or more suitable controllers or processors capable of executing scripts or instructions of one or more software programs stored in the client device 200 (e.g., within the memory 230). In some embodiments, the controller 220 may be implemented with a hardware controller, a processor, a state machine or other circuits to provide the functionality of the controller 220 executing instructions stored in the memory 230.

The controller 220 may execute the communications control SW module 232 to transmit and receive data via the transceiver 210. In some embodiments, execution of the communications control SW module 232 may allow the client device 200 to transmit and receive wireless messages, packets, frames, beacons, and the like. Execution of the communications control SW module 232 may enable transmission and/or reception of Bluetooth, BLE, Wi-Fi, LTE or any other feasible wireless communications message, packet, frame, beacon, and the like.

The controller 220 may execute the save and restore SW module 233 to manage the saving and restoring of state information of the client device 200. In some example implementations, execution of the save and restore SW module 233 may enable state information to be collected and stored in the state storage area 231 and then copied from the state storage area 231 into the NVRAM 240. Further, the execution of the save and restore SW module 233 may determine an amount of available power and then restore the state information of the client device 200 based on the determined amount of available power. In some implementations, execution of the save and restore SW module 233 may restore state information by copying associated portions or regions of the NVRAM 240 to the state storage area 231. Data loaded into the state storage area 231 may then be used to restore the state of the client device 200 to the state it was in prior to entering the low-power mode. In some other example implementations, some or all of the state storage area 231 may operate in a "retain mode." When in the retain mode, selected regions of the state storage area 231 may preserve previously stored data, may be temporarily unavailable for read and write operations, and may have a reduced power consumption.

Figure 3A:
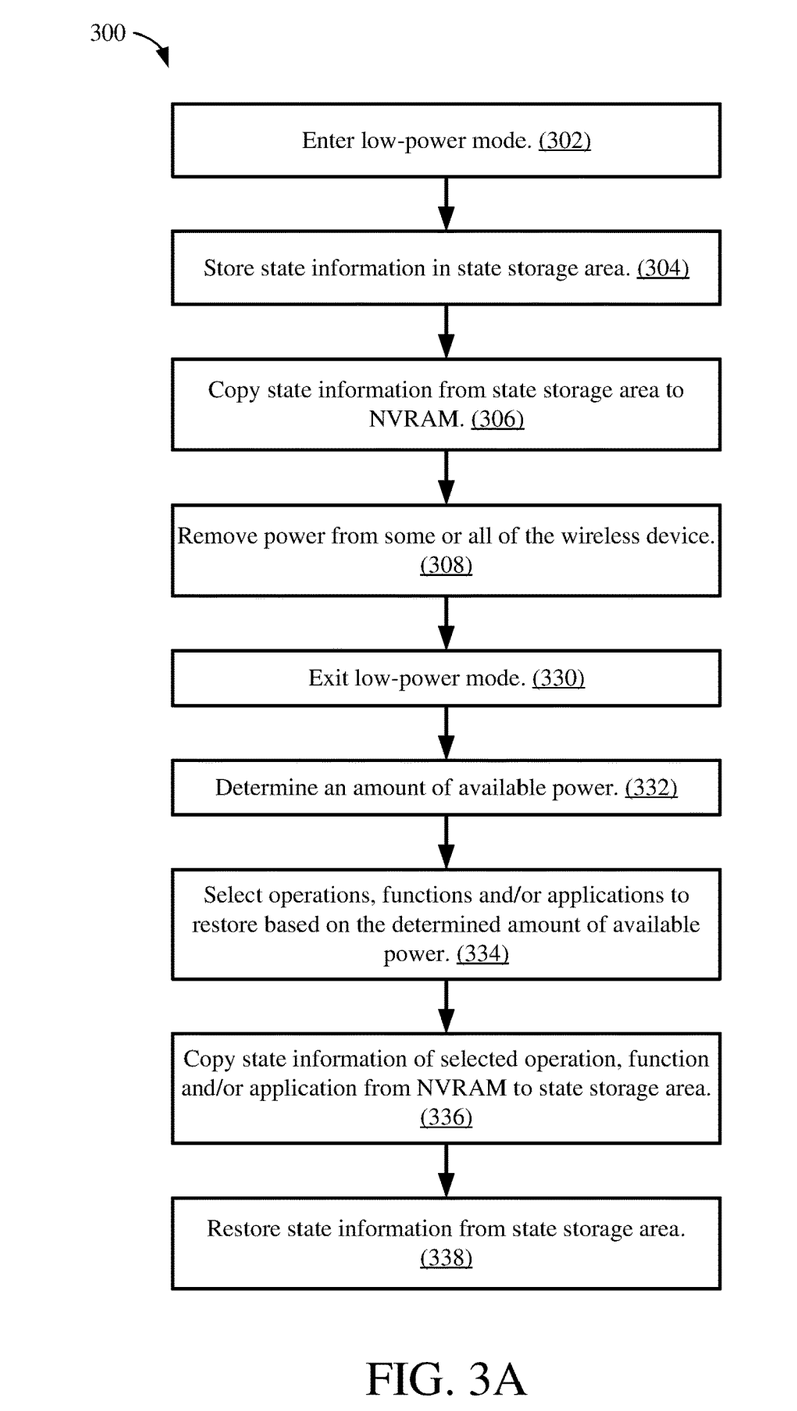
FIG. 3A is a flowchart depicting an example operation for performing save and restore operations, in accordance with some embodiments.

FIG. 3A is a flowchart depicting an example operation 300 for performing save and restore operations, in accordance with some embodiments. Although described herein as being performed by the client device 200 of FIG. 2, the operation 300 may be performed by the controller 220, the client device 120 or 130 of FIG. 1, or any other suitable device. The operation begins as the client device 200 enters the low-power mode (302). In some aspects, the client device 200 may be operating in an active power mode prior to entering the low-power mode. In the active power mode, the client device 200 may be performing operations, executing applications, communicating with other client or host devices, and the like. For example, in the active power mode, the client device 200 may be broadcasting a wireless communication message, such as a beacon message. After broadcasting the wireless communication message, the client device 200 may leave the active power mode and enter the low-power mode 302.

After entering the low-power mode 302, the client device 200 may store state information in the state storage area 231 of the memory 230 (304). The client device 200 may determine state information associated with memories, registers, flip-flops and the like of one or more regions of the client device 200. In some implementations, the controller 220 may arrange the state information in the state storage area 231 according to operations, functions, and/or applications being performed. For example, if the controller 220 is performing a beaconing operation, state information associated with the beaconing operation may be stored together (e.g., logically, near each other) in the state storage area 231. Similarly, state information of other operations, functions, and/or applications may be grouped together in the state storage area 231.

Next, state information in the state storage area 231 may be copied into the NVRAM 240 (306). In some aspects, the state information may be copied to the NVRAM 240 based on the same or similar groupings used within the state storage area 231. Thus, state information grouped together by operations, functions, and/or applications in the state storage area 231 may continue to be grouped together within the NVRAM 240. Next, power may be removed from some or all of the client device 200, for example, as the client device 200 enters the low-power mode (308). Removing power from some or all of the client device 200 may advantageously reduce power consumption.

Thereafter, the client device 200 may exit the low-power mode (330). In some example implementations, exiting the low-power mode may be based on a timer or the detection of an event. For example, the client device 200 may be configured to transmit a periodic beacon. Thus, a timer (not shown for simplicity) may cause the client device 200 to leave the low-power mode, enter the active-mode, and transmit the periodic beacon. In another example, the client device 200 may detect an event (e.g., detect the proximity of a wireless device or detect a user action). Upon detection of the event, the client device 200 may exit the low-power mode and perform an action or function associated with the detected event.

Leaving the low-power mode may include determining an amount of available power for the client device 200 (332). For example, the energy harvester 215 may have previously harvested power now stored in the charge-storage device 216. Thus, the client device 200 may measure how much power (voltage, current, and/or charge) is currently available in the charge-storage device 216 for restore operations.

Next, the client device 200 may select one or more operations, functions, and/or applications to restore based on the determined amount of available power (334). For example, a predetermined amount of power may be required to fully restore the state information (e.g., all the state information stored in the NVRAM 240) of the client device 200. If less than the predetermined amount of power is available (e.g., less than a threshold), then instead of fully restoring all the state information the client device 200, the state information of the client device may be partially restored. Thus, fewer than all operations, functions, and/or applications associated with stored state information may be restored based on available power. Partial restoration may include the client device 200 selecting a subset of available operations, functions, and/or applications to restore.

In some example implementations, the available applications and/or functions may be prioritized for restoration (e.g., through a priority list). The priority list may be determined before operation of the client device 200 or may be determined by the controller 220 while the client device 200 is in the active mode before entering the low-power mode in 330. By selecting a subset of available applications or functions to restore, the amount of power to restore the associated state information may be reduced compared to fully restoring all the state information.

Next, state information associated with the selected operations, functions, and/or applications may be copied from the NVRAM 240 to the state storage area 231 (336). Finally, state information stored in the state storage area 231 may be used to restore the state information of the selected operations, functions, and/or applications (338). In some implementations, the controller 220 may copy state information associated with the selected operations, functions, and/or applications from the state storage area 231 into appropriate sections of the client device 200.

As described above, the operation 300 describes the retrieval and restoration of state information based on the determined amount of available power. In some other implementations, prior to copying state information to NVRAM (in 304 and 306), the client device 200 may determine how much harvested power is available. Then, the client device 200 may save state information based on the determined amount of available harvested power. In this manner, the client device 200 may conserve power by storing a reduced or limited amount of state information. State information associated with applications and/or functions that will not be restored is not stored. Thus, in some environments when there may be a reduced amount of power available, a power savings (compared to operation 300) may be realized by reducing the energy associated with saving the state information. This operation is described in more detail with respect to FIG. 3B.

Figure 3B:
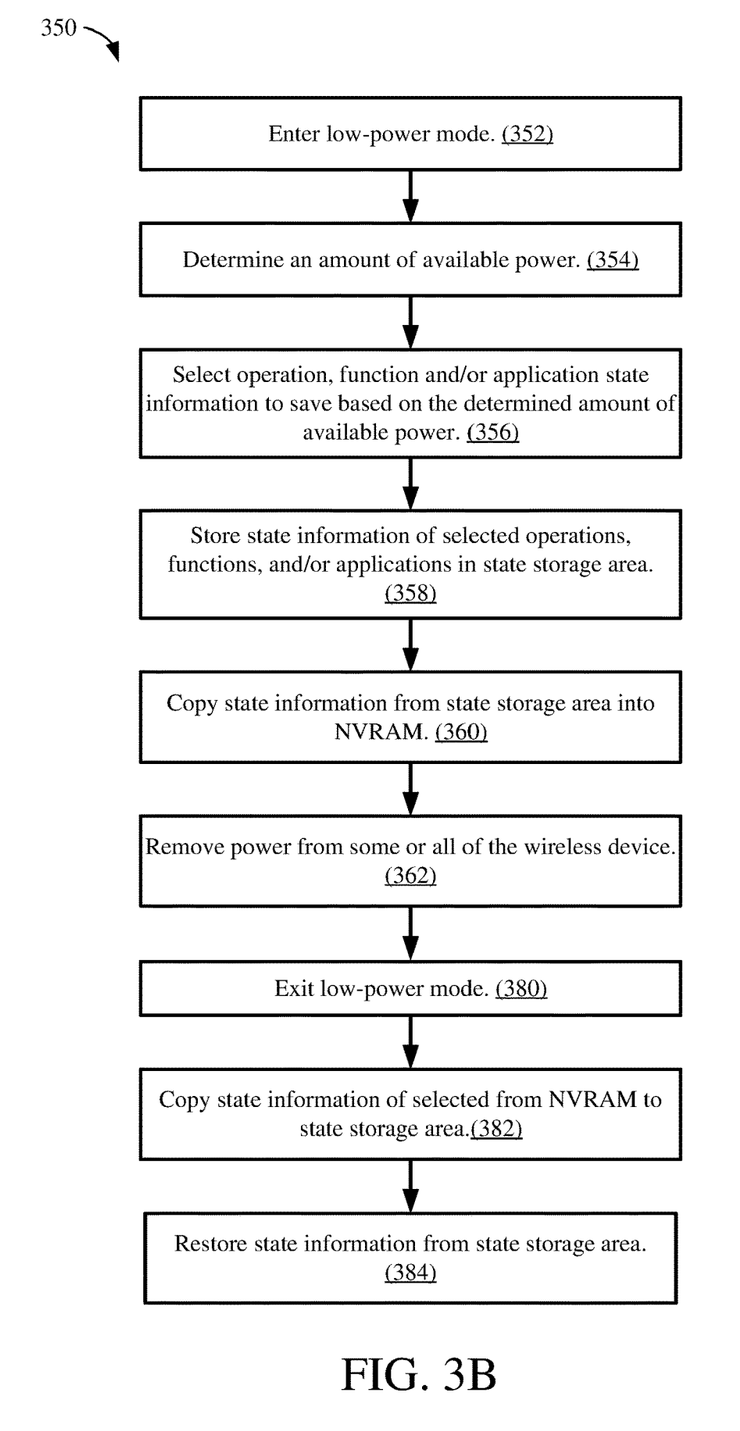
FIG. 3B is a flowchart depicting an another example operation for performing save and restore operations, in accordance with some embodiments.

FIG. 3B is a flowchart depicting another example operation 350 for performing save and restore operations, in accordance with some embodiments. Although described herein as being performed by the client device 200 of FIG. 2, the operation 350 may be performed by the controller 220, the client device 120 or 130 of FIG. 1, or any other suitable device. The operation begins as the client device 200 enters the low-power mode (352). Similar to operation 302 of FIG. 3A, the client device 200 may be in an active power mode prior to entering the low-power mode 352. Entering the low-power mode 352 may include determining an amount of available power (354). Similar to operation 332 of FIG. 3A, the client device 200 may measure the available power (voltage, charge, and/or current), for example, in the charge-storage device 216.

Next, the client device 200 may select operation, function, and/or application state information to save based on the determined amount of available power (356). In some implementations, the client device 200 may save more state information when more power is available and less state information when less power is available. In other words, fewer than all possible operations, functions, and/or applications may have their associated state information stored based on available power. The state information of the operations, functions, and/or applications may be selected based on a priority list similar to as described above with respect to FIG. 3A.

Next, the client device 200 may store the selected state information in the state storage area (358). The state information may be stored in the state storage area 231 of the memory 230 as described above with respect to operation 304 of FIG. 3A. Next, the client device 200 may copy the state information from the state storage area 231 to the NVRAM 240 (360). Next, power may be removed from some or all of the client device 200 (362). Operations 360 and 362 may be similar to operations 306 and 308 as described above with respect to FIG. 3A.

Next the client device 200 may exit the low-power mode (380). Leaving the low-power mode may include copying the state information from the NVRAM 240 to the state storage area 231 (382). Next, the client device 200 may restore the state information of operations, functions, and/or applications using the state information in the state storage area 231 (384). Operations 382 and 384 may be similar to operations 336 and 338 of FIG. 3A.

As described above, restoration of the state information of the client device 200 may be based on an amount of available harvested power. The state of the client device 200 may be partially restored if less than a predetermined amount of power is available to fully restore the client device. In another implementation, power may be saved by using the retain mode of the state storage area 231. The retain mode may enable the client device 200 to leave the low-power mode and restore the state information more quickly than the operation described above in FIGS. 3A and 3B. However, the client device 200 may consume more power using the retain mode of the state storage area 231 to store the state information than when using the NVRAM 240 to store the state information. Operations for saving state information by using the retain mode are described in more detail below in conjunction with FIG. 4.

Figure 4:
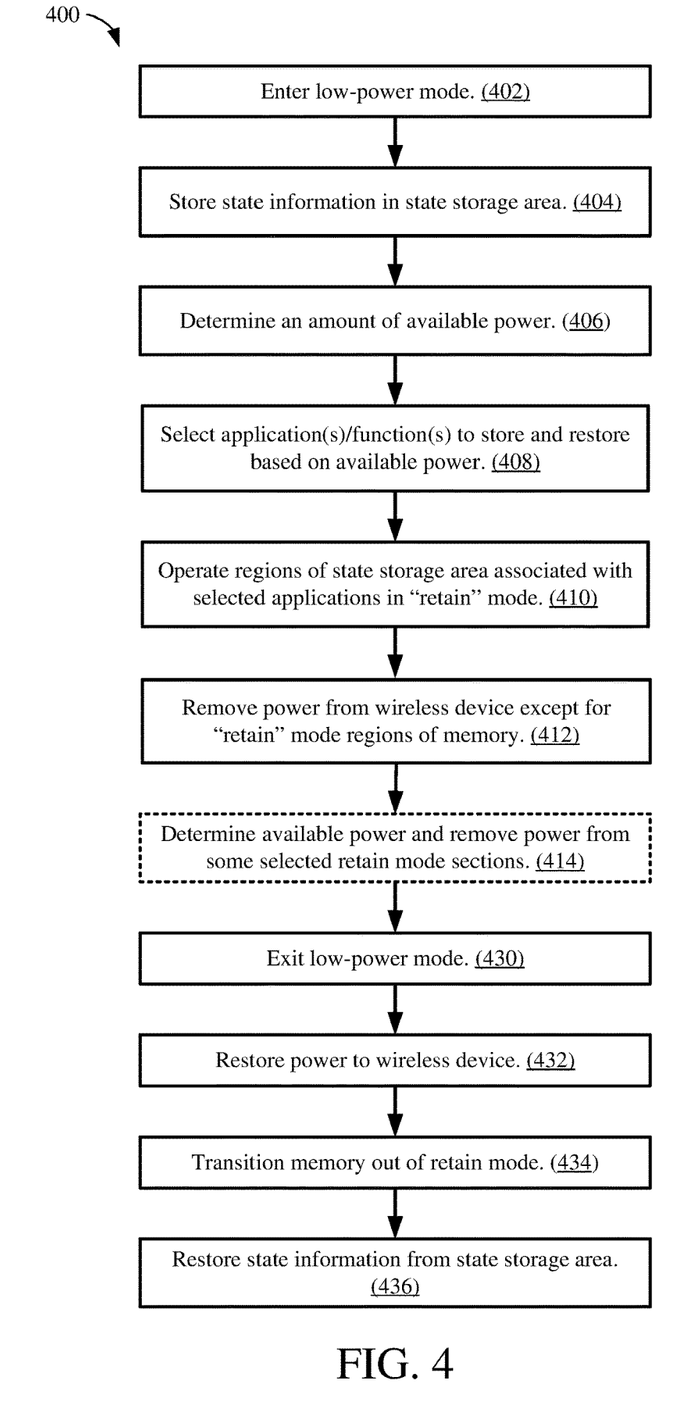
FIG. 4 shows a flowchart depicting another example operation for performing save and restore operations, in accordance with some embodiments.

FIG. 4 shows a flowchart depicting another example operation 400 for performing save and restore operations, in accordance with some embodiments. Although described herein as being performed by the client device 200 of FIG. 2, the operation 400 may be performed by the controller 220, the client device 120 or 130 of FIG. 1, or any other suitable device. The operation begins as the client device 200 enters the low-power mode (402).

Next, the client device 200 may store state information in the state storage area 231 of the memory 230 (404). The operation 404 may be similar to operation 304 described above with respect to FIG. 3. Next, the client device 200 may determine an amount of available power (406). In some implementations, the energy harvester 215 may have harvested power that is stored in the charge-storage device 216. Thus, the client device 200 may determine how much power is available in the charge-storage device 216 for state saving and restoring operations.

Next the client device 200 may select operations, functions, and/or applications to store and restore based on the determined amount of available power (408). Because the amount of available power may vary, the client device 200 may select varying subsets of possible operations, functions, and/or applications to save and restore. Saving and restoring fewer than all possible operations, functions, and/or applications may provide a power savings compared to saving and restoring all possible operations, functions, and/or applications. In some example implementations, the available operations, functions, and/or applications may be prioritized and selected for saving and restoring as described above with respect to FIGS. 3A and 3B.

Next, the client device 200 may operate one or more regions of the state storage area 231 associated with the selected operations, functions, and/or applications in the retain mode (410). In contrast to an operational or active power mode, the data in the regions of the state storage area 231 operating in the retain mode may no longer be available for reading or writing. The regions in the retain mode now operate in a very low-power mode where data is protected, and power consumption is drastically reduced.

Next, power may be removed from most or all of the client device 200, except for the one or more regions of the state storage area 231 operating in the retain mode (412). In some example implementations, one or more sections of the client device 200 may be powered down (e.g., power removed) to reduce power consumption. However, power is maintained for regions of the state storage area 231 operating in the retain mode. The client device 200 is now in the low-power mode.

Next, in an optional operation, the client device 200 may determine how much power is available and remove power from one or more retain mode regions of memory (414). (Operation 414 is depicted with dashed lines to indicated that this operation is optional). The client device 200 may monitor the available power while operating in the low-power mode. For example, the client device 200 (via the controller 220) may measure the power stored in the charge-storage device 216. In some implementations, if the amount of available power decreases to an amount less than a threshold, then the client device 200 may remove power from one or more of the regions of the memory 230 operating in the retain mode. Thus, the client device 200 may preserve the state of some applications/functions while losing the state of other applications/functions when the amount of available power falls to less below a threshold. The regions of the memory 230 operating in the retain mode that are disconnected from power may be determined by a priority list. The priority list may enable the state of less critical or important functions or features to be lost as available power becomes less than a threshold. The priority list may be determined as described above with respect to FIG. 2.

Next, the client device 200 may exit the low-power mode (430). Similar to as described with respect to FIGS. 3A and 3B, exiting the low-power mode may be based on timer or detecting an event. Exiting the low-power mode may include restoring power to the client device 200 (432). In some implementations, sections of the client device 200 that had had power removed in operation 412, may now have the power restored. Next, the client device 200 may transition the state storage area 231 from the retain mode into the normal mode (434). In this manner, all of the state storage area 231 may operate in the normal mode and all regions of the state storage area 231 may be available for read and write operations. Data that was previously protected within the regions of the state storage area 231 operating in the retain mode may now be accessed. Finally, state information stored in the state storage area 231 may be used to restore the state of the selected operations, functions, and/or applications (436). In some implementations, the client device 200 may determine which regions of the state storage area 231 were initially in the retain mode but later lost power due to reduced power availability in operation 414. The client device 200 may restore the state of operations, functions, and/or applications associated with the regions of the state storage area 231 that remained in the retain mode and not restore the state of operations, functions, and/or applications associated with regions of the state storage area 231 that did not remain in the retain mode.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for saving and restoring state information of a wireless device, the method performed by the wireless device and comprising:
   storing, in a memory of the wireless device, state information associated with one or more operations performed by the wireless device;
   powering down at least part of the wireless device;
   determining an amount of available power of the wireless device;
   selecting one or more operations to restore in response to the determined amount of available power being less than a threshold amount of available power, wherein comprise fewer than all available operations to restore; and
   restoring the state information of the one or more selected operations from the memory.

2. The method of claim 1, wherein the amount of available power is based at least in part on power harvested from radio-frequency (RF) energy received by the wireless device.

3. The method of claim 1, wherein storing the state information comprises copying the state information into a random access memory (RAM).

4. The method of claim 3, further comprising:
   operating regions of the RAM including the state information in a retain mode, wherein the state information is protected and is unavailable for access.

5. The method of claim 4, wherein power is maintained for at least the regions of the RAM operating in the retain mode while powering down at least part of the wireless device.

6. The method of claim 1, wherein storing the state information comprises copying the state information from a state storage area of a random access memory (RAM) to a non-volatile RAM.

7. The method of claim 1, wherein selecting the one or more operations to restore is based at least in part on a priority list.

8. The method of claim 1, wherein storing the state information comprises:
selecting the state information of fewer than all of the one or more selected operations if the determined amount of available power is less than a threshold; and
storing the selected state information.

9. The method of claim 1, wherein determining the amount of available power comprises measuring at least one of a voltage, a current, or a charge within a charge-storage device.

10. A wireless device comprising:
an energy harvester configured to convert radio-frequency (RF) energy into power for the wireless device;
one or more processors; and
a memory configured to store instructions that, when executed by the one or more processors, cause the wireless device to:
store state information associated with one or more operations performed by the wireless device;
power down at least part of the wireless device;
determine an amount of available power of the wireless device;
select one or more operations to restore in response to the determined amount of available power being less than a threshold amount of available power, wherein the one or more operation comprise fewer than all available operations to restore; and
restore the state information of the selected operations.

11. The wireless device of claim 10, wherein execution of the instructions to store state information causes the wireless device to:
copy the state information into a random access memory (RAM); and
operate regions of the RAM including the state information in a retain mode, wherein the state information is protected and is unavailable for access.

12. The wireless device of claim 11, wherein power is maintained for at least the regions of the RAM operating in the retain mode while powering down at least part of the wireless device.

13. The wireless device of claim 10, wherein execution of the instructions to store the state information causes the wireless device to:
copy the state information from a state storage area of a random access memory (RAM) to a non-volatile RAM.

14. The wireless device of claim 10, wherein execution of the instructions to store state information causes the wireless device to:
select the state information of fewer than all of the one or more selected operations if the determined amount of available power is less than a threshold; and
store the selected state information.

15. An apparatus comprising:
means for converting radio-frequency (RF) energy into power for the apparatus;
means for storing state information associated with one or more operations performed by the apparatus;
means for powering down at least part of the apparatus;
means for determining an amount of available power of the apparatus;
means for selecting one or more operations to restore in response to the determined amount of available power being less than a threshold amount of available power, wherein the one or more operations comprise fewer than all available operations to restore; and
means for restoring the state information of the one or more selected operations.

16. The apparatus of claim 15, wherein the determined amount of available power is based at least in part on power harvested from RF energy received by the apparatus.

17. The apparatus of claim 15, wherein the means for storing the state information comprises:
copying the state information into a random access memory (RAM); and
operating regions of the RAM including the state information in a retain mode, wherein the means for powering down comprises maintaining power for at least the regions of the RAM operating in the retain mode.

* * * * *